US008595101B1

(12) United States Patent
Daukas et al.

(10) Patent No.: US 8,595,101 B1
(45) Date of Patent: Nov. 26, 2013

(54) SYSTEMS AND METHODS FOR MANAGING CONSUMER ACCOUNTS USING DATA MIGRATION

(75) Inventors: David Francis Daukas, Costa Mesa, CA (US); Christopher R. Shakespeare, Newark, DE (US)

(73) Assignee: Exerian Information Solutions, Inc., Costa Mesa, CA (US)

( * ) Notice: Subject to any disclaimer, the term of this patent is extended or adjusted under 35 U.S.C. 154(b) by 507 days.

(21) Appl. No.: 12/554,760

(22) Filed: Sep. 4, 2009

Related U.S. Application Data

(60) Provisional application No. 61/095,252, filed on Sep. 8, 2008.

(51) Int. Cl.
G06Q 40/00 (2012.01)

(52) U.S. Cl.
USPC ............................. 705/35; 705/7.29; 705/38

(58) Field of Classification Search
USPC ........................................... 705/7.29, 35, 38
See application file for complete search history.

(56) References Cited

U.S. PATENT DOCUMENTS

| | | |
|---|---|---|
| 5,649,114 A | 7/1997 | Deaton et al. |
| 5,659,731 A | 8/1997 | Gustafson |
| 5,940,812 A | 8/1999 | Tengel et al. |
| 5,950,179 A | 9/1999 | Buchanan et al. |
| 5,970,478 A | 10/1999 | Walker et al. |
| 6,073,140 A | 6/2000 | Morgan et al. |
| 6,144,948 A | 11/2000 | Walker et al. |
| 6,343,279 B1 | 1/2002 | Bissonette et al. |
| 6,374,230 B1 | 4/2002 | Walker et al. |
| 6,457,012 B1 | 9/2002 | Jatkowski |
| 6,513,018 B1 | 1/2003 | Culhane |

(Continued)

FOREIGN PATENT DOCUMENTS

WO WO 2004/114160 12/2004

OTHER PUBLICATIONS

U.S. Appl. No. 12/705,489, filed Feb. 12, 2010, Bargoli et al.
U.S. Appl. No. 12/705,512, filed Feb. 12, 2010, Bargoli et al.

(Continued)

Primary Examiner — William Rankins
(74) Attorney, Agent, or Firm — Knobbe Martens Olson & Bear LLP

(57) ABSTRACT

Systems and methods for tracking consumer data are provided. The method includes accessing a plurality of attributes, calculating the plurality of attributes for a first time period for a plurality of consumer accounts, calculating the same plurality of attributes at a first subsequent time period for the same plurality of consumer accounts, comparing output values of the plurality of attributes from the first subsequent period with the first time period, and if the output value meets a specified threshold of change, then storing migrated attribute information and outputting the consumer account with the plurality of attributes and the migrated attribute information. The system includes a processor, a memory in electronic communication with the processor, and a data migration attribute tracking module. The migration attribute tracking module is configured to access a plurality of attributes, calculate the plurality of attributes for a first time period for a plurality of consumer accounts, calculate the same plurality of attributes at a first subsequent time period for the same plurality of consumer accounts, compare output values of the plurality of attributes from the first subsequent period with the first time period, and if the output value meets a specified threshold of change, store migrated attribute information and output the consumer account with the plurality of attributes and the migrated attribute information.

26 Claims, 6 Drawing Sheets

(56) References Cited

U.S. PATENT DOCUMENTS

| | | | |
|---|---|---|---|
| 6,622,266 B1 | 9/2003 | Goddard et al. | |
| 6,658,393 B1 | 12/2003 | Basch et al. | |
| 6,703,930 B2 | 3/2004 | Skinner | |
| 6,865,566 B2 | 3/2005 | Serrano-Morales et al. | |
| 6,901,406 B2 | 5/2005 | Nabe et al. | |
| 6,965,889 B2 | 11/2005 | Serrano-Morales et al. | |
| 7,028,052 B2 | 4/2006 | Chapman et al. | |
| 7,039,176 B2 | 5/2006 | Borodow et al. | |
| 7,133,935 B2 | 11/2006 | Hedy | |
| 7,152,053 B2 | 12/2006 | Serrano-Morales et al. | |
| 7,200,602 B2 | 4/2007 | Jonas | |
| 7,249,113 B1 | 7/2007 | Continelli et al. | |
| 7,343,295 B2 | 3/2008 | Pomerance | |
| 7,542,993 B2 | 6/2009 | Satterfield et al. | |
| 7,543,739 B2 | 6/2009 | Brown et al. | |
| 7,584,146 B1* | 9/2009 | Duhon | 705/38 |
| 7,676,751 B2 | 3/2010 | Allen et al. | |
| 7,725,385 B2 | 5/2010 | Royer et al. | |
| 7,747,559 B2 | 6/2010 | Leitner et al. | |
| 7,836,111 B1* | 11/2010 | Shan | 708/200 |
| 7,966,192 B2 | 6/2011 | Pagliari et al. | |
| 7,970,676 B2* | 6/2011 | Feinstein | 705/35 |
| 7,991,689 B1 | 8/2011 | Brunzell et al. | |
| 8,001,042 B1 | 8/2011 | Brunzell et al. | |
| 8,036,979 B1 | 10/2011 | Torrez et al. | |
| 8,078,528 B1 | 12/2011 | Vicente et al. | |
| 8,160,960 B1* | 4/2012 | Fei et al. | 705/39 |
| 8,315,943 B2 | 11/2012 | Torrez et al. | |
| 2001/0011245 A1 | 8/2001 | Duhon | |
| 2001/0044729 A1 | 11/2001 | Pomerance | |
| 2002/0077964 A1 | 6/2002 | Brody et al. | |
| 2002/0107957 A1 | 8/2002 | Zargham et al. | |
| 2002/0165757 A1* | 11/2002 | Lisser | 705/10 |
| 2002/0169747 A1 | 11/2002 | Chapman et al. | |
| 2004/0023637 A1* | 2/2004 | Johnson et al. | 455/405 |
| 2004/0128150 A1 | 7/2004 | Lundegren | |
| 2004/0128230 A1 | 7/2004 | Oppenheimer et al. | |
| 2004/0230534 A1 | 11/2004 | McGough | |
| 2005/0154664 A1* | 7/2005 | Guy et al. | 705/35 |
| 2005/0279827 A1 | 12/2005 | Mascavage et al. | |
| 2005/0288998 A1 | 12/2005 | Verma et al. | |
| 2006/0031158 A1* | 2/2006 | Orman | 705/38 |
| 2006/0036543 A1 | 2/2006 | Blagg et al. | |
| 2006/0178971 A1 | 8/2006 | Owen et al. | |
| 2006/0267999 A1 | 11/2006 | Cash et al. | |
| 2006/0282359 A1 | 12/2006 | Nobili et al. | |
| 2006/0293932 A1 | 12/2006 | Cash et al. | |
| 2006/0293979 A1 | 12/2006 | Cash et al. | |
| 2007/0027778 A1 | 2/2007 | Schellhammer et al. | |
| 2007/0030282 A1 | 2/2007 | Cash et al. | |
| 2007/0067437 A1 | 3/2007 | Sindambiwe | |
| 2007/0094137 A1 | 4/2007 | Phillips et al. | |
| 2008/0120569 A1 | 5/2008 | Mann et al. | |
| 2008/0235063 A1* | 9/2008 | Kasower | 705/4 |
| 2008/0301016 A1 | 12/2008 | Durvasula et al. | |
| 2009/0012889 A1* | 1/2009 | Finch | 705/35 |
| 2009/0089190 A1* | 4/2009 | Girulat, Jr. | 705/30 |
| 2009/0164380 A1 | 6/2009 | Brown | |
| 2009/0222379 A1* | 9/2009 | Choudhuri et al. | 705/38 |
| 2010/0250411 A1 | 9/2010 | Ogrodski | |
| 2012/0124498 A1 | 5/2012 | Santoro et al. | |
| 2012/0136763 A1 | 5/2012 | Megdal et al. | |
| 2012/0158574 A1 | 6/2012 | Brunzell et al. | |
| 2012/0173339 A1 | 7/2012 | Flynt et al. | |
| 2013/0080315 A1 | 3/2013 | Torrez et al. | |

OTHER PUBLICATIONS

"Parse", Definition from PC Magazine Encyclopedia, http://www/pcmag.com/encyclopedia_term_0,2542,t=parse&i=48862,00.asp as downloaded Mar. 5, 2012.

Announcing TrueProfiler, http://web.archive.org/web/20021201123646/http://www.truecredit.com/index.asp, dated Dec. 1, 2002, 2 pages.

Anonymous; "Credit-Report Disputes Await Electronic Resolution"; Credit Card News; Chicago: Jan. 15, 1993; vol. 5, Issue 19; p. 5.

Anonymous; "MBNA Offers Resolution of Credit Card Disputes"; Hempstead: Feb. 2002; vol. 68, Issue 2; p. 47.

Stein, Benchmarking Default Prediction Models: Pitfalls and Remedies in Model Validation, Moody's KMV, Revised Jun. 13, 2002, Technical Report #020305; New York.

CreditAnalyst, Digital Matrix Systems, as printed out Mar. 4, 2008, pp. 1-2.

International Search Report and Written Opinion dated Sep. 28, 2012 for Application No. PCT/US2012/046316.

* cited by examiner

SYSTEMS AND METHODS FOR MANAGING CONSUMER ACCOUNTS USING DATA MIGRATION

CROSS-REFERENCE TO RELATED APPLICATIONS

The present application claims the benefit under 35 U.S.C. 119(c) to U.S. Provisional Application No. 61/095,252, filed Sep. 8, 2008, which is hereby incorporated by reference herein in its entirety, including specifically but not limited to systems and methods relating to managing customer accounts using data migration.

BACKGROUND

Embodiments of the disclosure generally relate to financial data processing, and more particularly to methods and systems for managing consumer accounts using data migration.

SUMMARY OF THE DISCLOSURE

In one embodiment, a computerized method for tracking consumer data is provided. The method includes accessing a plurality of attributes, calculating the plurality of attributes for a first time period for a plurality of consumer accounts, calculating the same plurality of attributes at a first subsequent time period for the same plurality of consumer accounts, comparing output values of the plurality of attributes from the first subsequent period with the first time period, and if the output value meets a specified threshold of change, then storing migrated attribute information and outputting the consumer account with the plurality of attributes and the migrated attribute information.

In another embodiment, a system configured to track consumer data is disclosed. The system includes a processor, a memory in electronic communication with the processor, and a data migration attribute tracking module. The migration attribute tracking module is configured to access a plurality of attributes, calculate the plurality of attributes for a first time period for a plurality of consumer accounts, calculate the same plurality of attributes at a first subsequent time period for the same plurality of consumer accounts, compare output values of the plurality of attributes from the first subsequent period with the first time period, and if the output value meets a specified threshold of change, store migrated attribute information and output the consumer account with the plurality of attributes and the migrated attribute information.

For purposes of summarizing embodiments of the invention, certain aspects, advantages, and novel features of the invention have been described herein. It is to be understood that not necessarily all such aspects, advantages, or novel features will be embodied in any particular embodiment of the invention.

BRIEF DESCRIPTION OF THE DRAWINGS

The foregoing and other features, aspects and advantages of the present invention are described in detail below with reference to the drawings of various embodiments, which are intended to illustrate and not to limit the invention. The drawings comprise the following figures in which.

DESCRIPTION OF THE EMBODIMENTS

The terminology used in the description presented herein is not intended to be interpreted in any limited or restrictive manner, simply because it is being utilized in conjunction with a detailed description of certain specific embodiments of the invention. Furthermore, embodiments of the invention may include several novel features, no single one of which is solely responsible for its desirable aspects or which is essential to practicing the inventions described herein.

Data migration can be used for consumer account management to track the volatility of data that provides early signs of potential behaviors. In one embodiment, the data includes attributes and/or scores reflective of potential behavior. The behavior can include negative actions such as potential derogatory or delinquent behaviors, as well as positive actions, such as potential increase in spending power. Accordingly, attributes and/or scores may be tracked which indicate an increased likelihood of certain behaviors. Examples of such attributes and/or scores include increases on total revolving debt, increases in total utilization, changes in specific risk scores (such as for example Vantage Score, Scorex Plus scores, and so forth), changes in utilization, changes in credit balances, changes in credit limits, and the like. In some embodiments, some of the features of the system and method may be customizable by the customer, such that the customer can select which behavior to monitor, which attributes and/or scores to track, as well as what criteria to use to do the tracking.

Attributes may generally be formed and/or modified by using, summarizing and/or categorizing different codes and statuses associated with data, such as credit or financial data. Some codes and statuses of credit data include, for example: account condition, payment status, kinds of businesses, payment history, terms frequency, subscriber code, delinquency counts, purpose of account, ECOA codes, public record explanation, special comment codes, compliance condition codes. In addition, updates in credit bureau data and industry trends may also be used in attribute formation and modification. The credit attributes help provide consumer data at the most granular level providing enhanced modeling opportunities, thus helping organizations make more strategic and data driven decisions. Attributes can also be used to calculate various types of scores.

Figure 1:
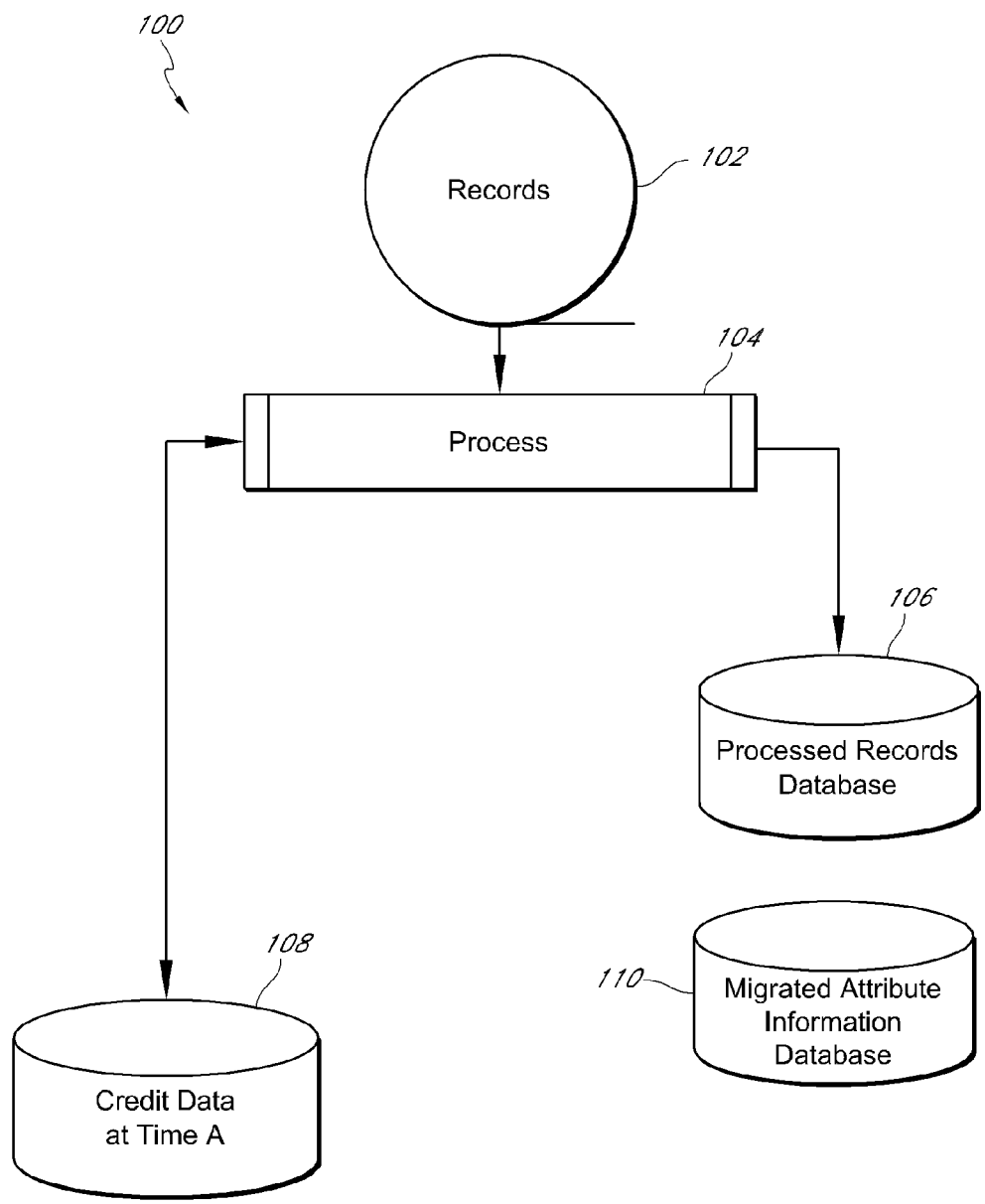
FIG. 1 is one embodiment of a high-level block diagram depicting one embodiment of the system at a first time period A.

One embodiment of a data migration system will now be discussed with respect to FIGS. 1-3, which show high-level block diagrams of one embodiment of the system at three consecutive time periods.

In the example, a company which manages consumer accounts would like to receive early warning signs of potential derogatory or delinquent behaviors about its consumer accounts. As depicted in FIG. 1, the company system sends records 102 to the data migration system 100 for consumer accounts for which company would like to receive warning signs. The data migration system 100 stores credit data about consumers in a database 108, and part of that data includes credit activities, balance, available credit and utilization, total revolving debt, total utilization, risk scores (such as for example Vantage Score, Scorex Plus scores, and so forth), consumer address information, consumer phone information, consumer contact information. The data migration system 100 uses this credit data 108 at a first time period A to process the records 102 received from the company system. The company system may include one or more systems. In the processing component 104, the data migration system 100 retrieves/accesses credit data for the consumers in the records 102 and calculates several attributes and scores based on the credit data 108 associated with the records at the first time period A. The attributes and scores calculated by the data migration system 100 may be customized by the customer. After processing, the data migration system 100 outputs the processed records to a processed records database 106.

Figure 2:
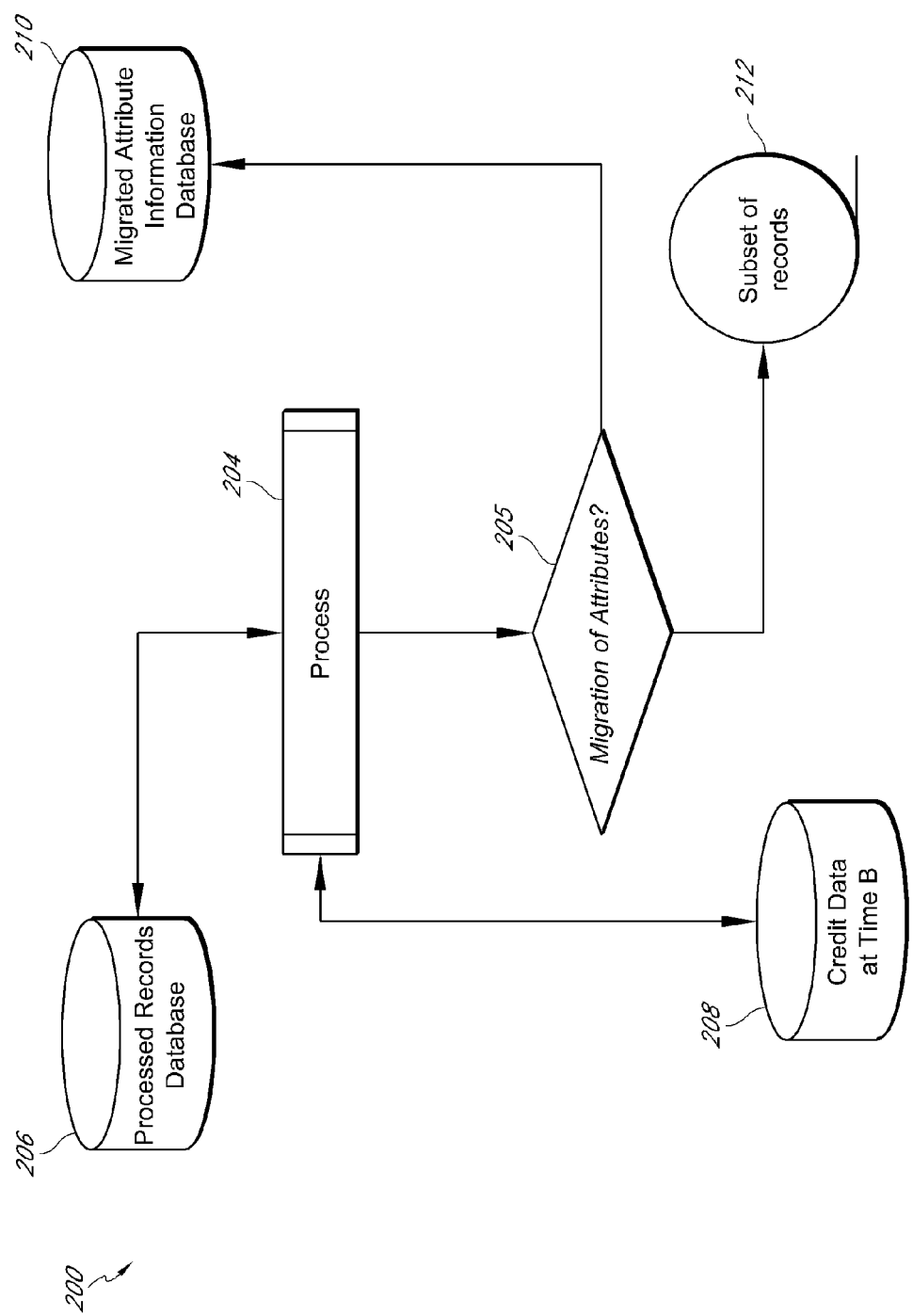
FIG. 2 is one embodiment of a high-level block diagram depicting the embodiment of FIG. 1 at a first subsequent time period B.

Then, as illustrated in the embodiment of FIG. 2, at a first subsequent time period B, the data migration system 200 processes the same consumer records using credit data 208 at the first subsequent time period B. At this first subsequent time period B, the data migration system 200 accesses the records from the processed records database 206. In some embodiments, the first subsequent time period B may be one month, two weeks, one week, or one day after the first time period A. Other time periods may also be used. Because of the dynamic nature of credit data, the credit data 208 at the first subsequent time period B can be different from the credit data 108 at the first time period A. Therefore, at the first subsequent time period B, the data migration system 200 retrieves/accesses credit data for the consumers in the records 102 and recalculates, at the processing component 204, the same attributes and scores for the same consumers calculated at the first time period A, based on the credit data 208 associated with the records at the first subsequent time period B.

After recalculating, the data migration system 200 outputs the processed records to the processed records database 206. In addition, the data migration system 200 compares one or more of the attributes and scores calculated during the first subsequent time period B with those calculated during the first time period A, and makes a determination of whether there has been a migration of attributes, as represented in block 205.

In one embodiment, an attribute might be considered a migrated attribute if it meets a specified threshold of change. The customer may select threshold criteria to be used for each attribute and/or score. For example, thresholds of change might comprise threshold values based on credit data criteria, threshold values based on logic, threshold values based on other values, and/or a combination of these. Threshold values based on credit data criteria may comprise, for example: (1) credit data crossing a selected value; (2) credit data crossing a selected change of value; (3) credit data crossing a selected numerical value a selected number of times within consecutive time periods; and/or (4) credit data crossing a selected change of value a selected number of times within consecutive time periods. Threshold values based on logic might comprise, for example: (1) combination of several attributes individually crossing thresholds; (2) combination of attributes collectively crossing a threshold; (3) thresholds crossed for a non-critical attribute but not a critical attribute; and/or (4) thresholds crossed by more than a selected number of attributes. The customer may optionally select different threshold criteria for each attribute and score.

If the data migration system 200 determines that there has been a migration of attributes at block 205, then the data migration system 200 outputs the subset of records 212 for which the attributes have had migration, to the customer systems. The customer may select several options for delivery. For example, the customer can decide to receive: (1) only records meeting migration criteria; (2) the actual attributes from relevant time periods; (3) the threshold criteria value used. Additionally, the customer might select to receive the threshold criteria value either as an attribute, a score, or both. The data migration system 200 also outputs the migrated attribute information to the migration attribute information database 210.

Figure 3:
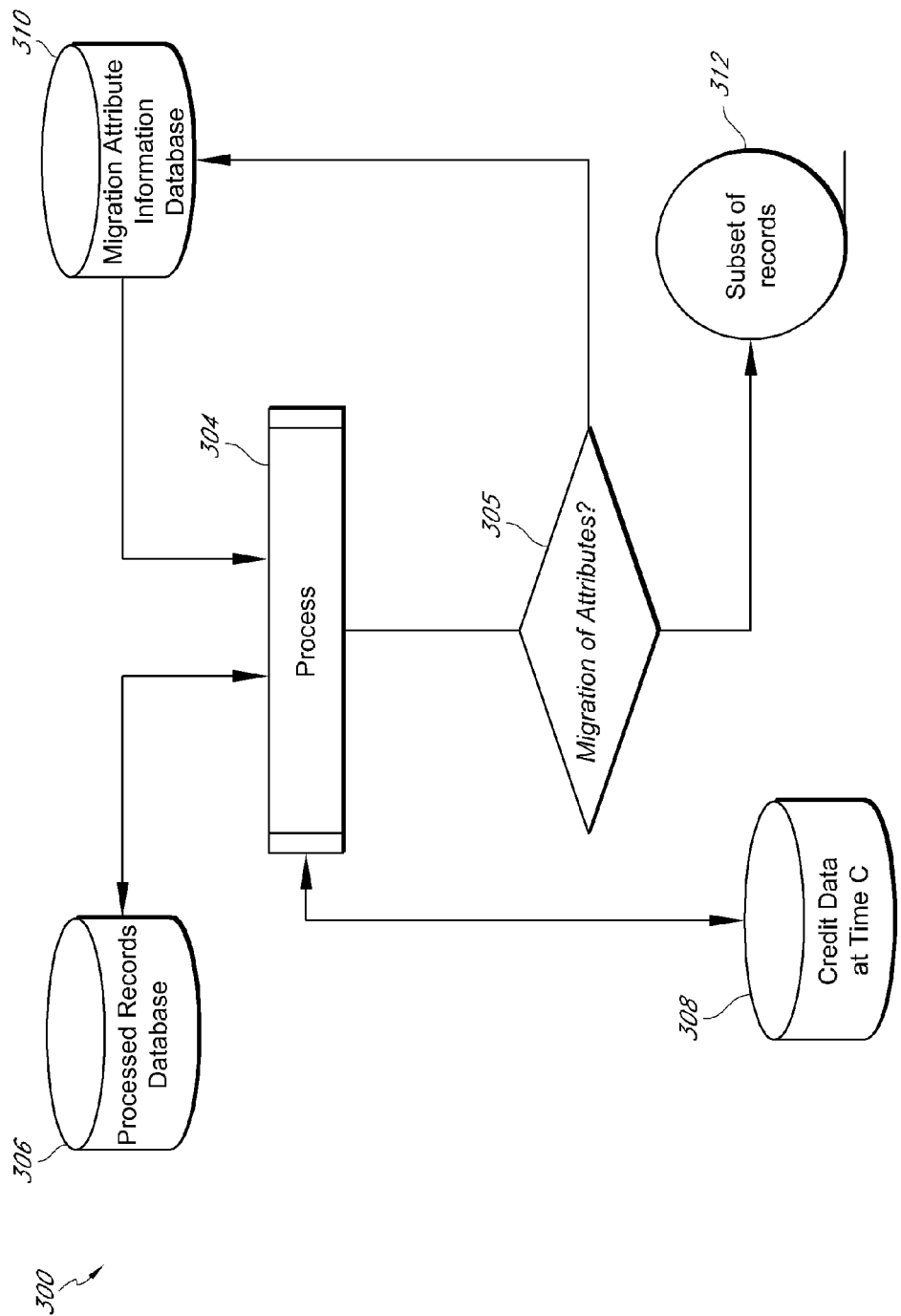
FIG. 3 is one embodiment of a high-level block diagram depicting the embodiment of FIG. 1 at a second subsequent time period C.

Then, as illustrated in FIG. 3, at a second subsequent time period C, the data migration system 300 processes the same consumer records using credit data at the second subsequent time period C. At this second subsequent time period C, the data migration system 300 accesses the records from the processed records database 306, as well as the information stored in the migration attribute information database 310. In some embodiments, the second subsequent time period C may be one month, two weeks, one week, and/or one day after the first time period B. Other time periods may also be used. The time difference between time period C and time period B might be the same or different than the time difference between time period B and time period A. Because of the dynamic nature of credit data, the credit data 308 at the second subsequent time period C can be different from the credit data 108 at the first time period A and/or from the credit data 208 at the first subsequent time period B. Therefore, at the second subsequent time period C, the data migration system 300 recalculates, at the processing component 304, the same attributes and scores for the same consumers calculated at the first time period A and the first subsequent time period B, based on the credit data 308 associated with the records at the second subsequent time period C.

After processing, the data migration system 300 outputs the processed records to the processed records database 306. In addition, the data migration system 300 compares one or more of the attributes and scores calculated during the second subsequent time period C with (1) the attributes and scores calculated during the first time period A, (2) the attributes and scores calculated during the first subsequent time period B, and/or (3) the migrated attributes determined during the first subsequent time period B, and makes a determination of whether there has been another migration of attributes, as represented in block 305.

In one embodiment, an attribute might be considered a migrated attribute if it meets a specified threshold of change. The customer may select threshold criteria to be used for each attribute and/or score. For example, thresholds of change might comprise threshold values based on credit data criteria, threshold values based on logic or threshold values based on other values. Threshold values based on credit data criteria may comprise, for example: (1) credit data crossing a selected value; (2) credit data crossing a selected change of value; (3) credit data crossing a selected numerical value a selected number of times within consecutive time periods; and/or (4) credit data crossing a selected change of value a selected number of times within consecutive time periods. Threshold values based on logic might comprise, for example: (1) combination of several attributes individually crossing thresholds; (2) combination of attributes collectively crossing a threshold; (3) hierarchy between different attributes (whether a critical and/or a non-critical attribute has crossed the threshold); and/or (4) thresholds crossed by more than a selected number of attributes. The customer may optionally select different threshold criteria for each attribute and score.

If the data migration system 300 determines that there has been a migration of attributes at block 305, then the data migration system 300 outputs the subset of records 312 for which the attributes have had migration, to the customer systems. The customer may select several options for delivery. For example, the customer can decide to receive: (1) only records meeting migration criteria; (2) the actual attributes from relevant time periods; (3) the threshold criteria value used; (4) information regarding a migrated non-critical attribute depending on whether a critical attribute has also migrated. Additionally, the customer might select to receive the threshold criteria value either as an attribute, a score, or both. The data migration system 300 also outputs the migrated attribute information to the migration attribute information database 310.

For subsequent time periods, the data migration system can be represented by FIG. 3, where the comparison that occurs at block 305 takes into consideration the information from all previous time periods.

Figure 4:
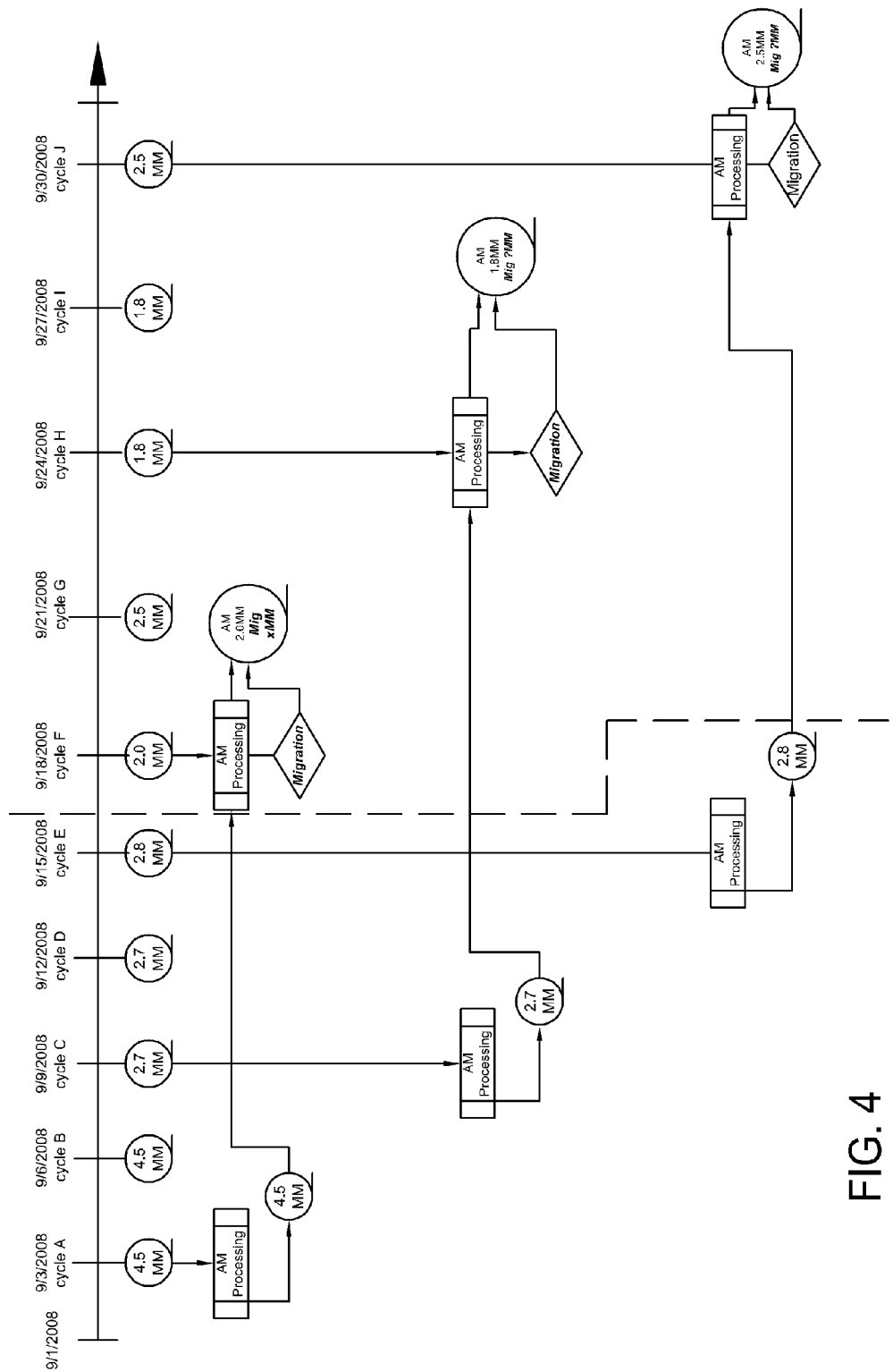
FIG. 4 is one embodiment of a block diagram depicting a timeline of events for an example system.

FIG. 4 is a block diagram depicting a timeline of events for an example data migration system. The example customer might be a credit card company. Typically, credit card companies operate on several different billing cycles each month. During each cycle, a portion of the company's consumer's accounts become due. In the example shown in FIG. 4, a ten-cycle month is illustrated.

On Sep. 3, 2008, the credit card company system might send the 4.5 million records of consumers on cycle A to the data migration system. The company system may include one or more systems. On that day, the data migration system processes the records, and calculates the relevant attributes for all 4.5 million records received. The company system sends all consumer records to the data migration system on each billing cycle, and the data migration system processes those records, and calculates the relevant attributes for all records received (but not all are shown in the diagram of FIG. 4). For example, as shown in FIG. 4, there are 2.7 million records sent and processed on Sep. 9, 2008 (cycle C), 2.8 million records sent and processed on Sep. 15, 2008.

In the example shown in FIG. 4, the credit card company has elected to receive warning signs of potential derogatory or delinquent behaviors on their consumer accounts on an interval of 15 days. Therefore, on Sep. 18, 2008, in addition to the 2.0 million records that the data migration system processes (corresponding to cycle F), the data migration system also performs a recalculation of the attributes for the 4.5 million records from cycle A, in order to do a comparison with the attributes calculated on Sep. 3, 2008, and determine whether there has been a migration of attributes. And, if the data migration system determines that there has been a migration, then it outputs to the credit card company systems the information associated with the subset of records for which there has been a migration of attributes.

Figure 5:
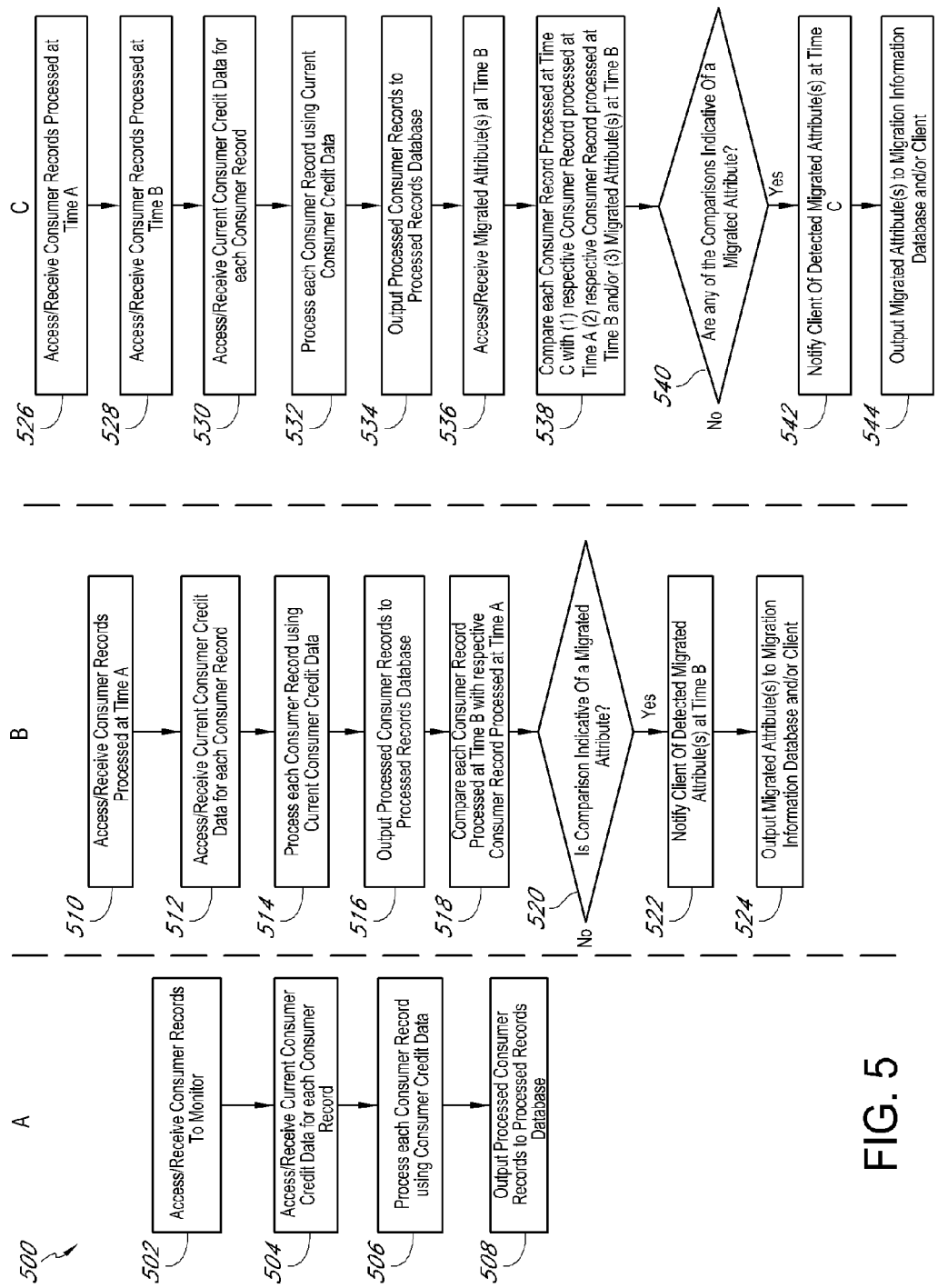
FIG. 5 illustrates an embodiment of a flow chart showing one method of managing consumer accounts using data migration system.

FIG. 5 illustrates an embodiment of a flow chart showing one method (for example, a computer-implemented method) of managing consumer accounts using data migration. The method can be performed online, in real-time, batch, periodically, and/or on a delayed basis for individual consumer records or a plurality of consumer records. In different embodiments, the blocks described below may be removed, others may be added, and the sequence of the blocks may be altered.

With reference to FIG. 5, the method 500 starts at block 502 at time A, when the data migration system accesses or receives consumer records. At block 504, the data migration system accesses current credit data for each of the consumer records accessed or received at block 502. In an embodiment, credit data includes for example, balance data, credit limits data, or the like.

At block 506, the data migration system processes each consumer record using the credit data at time A, to determine the relevant attributes and/or scores associated with each consumer record. Once the relevant attributes and/or scores are determined, the data migration system outputs the processed records to the processed records database at block 508.

Then, at time B, at block 510, the data migration system accesses or receives the consumer records processed at time A. At block 512, the data migration system accesses current credit data for each of the consumer records accessed or received at block 510. At block 514, the data migration system processes each consumer record using the credit data at time B, to determine the relevant attributes and/or scores associated with each consumer record. Once the relevant attributes and/or scores are determined, the data migration system outputs the processed records to the processed records database at block 516. Additionally, at block 518, the data migration system compares each of the consumer records processed at time B with the consumer records processed at time A. At decision block 520, the data migration system determines whether the comparison indicates a migrated attribute. If the comparison does indicate a migrated attribute, then the data migration system moves on to block 522, and notifies the client of the migrated attribute(s) detected, and outputs the migrated attribute information to the migration attribute information database and/or to the client, at block 524. If the comparison does not indicate a migrated attribute, then the system does nothing until time C.

Then, at time C, at block 526, the data migration system accesses or receives the consumer records processed at time A. At block 528, the data migration system accesses or receives the consumer records processed at time B. At block 530, the data migration system accesses current credit data for each of the consumer records accessed or received at blocks 526 and 528. At block 532, the data migration system processes each consumer record using the credit data at time C, to determine the relevant attributes and/or scores associated with each consumer record. Once the relevant attributes and/or scores are determined, the data migration system outputs the processed records to the processed records database at block 534. At block 536, the data migration system accesses or receives information about migrated attributes of time B. Then, at block 538, the data migration system compares each of the consumer records processed at time C with (1) the consumer records processed at time A, (2) the consumer records processed at time B, and/or (3) the migrated attributes of time B. At decision block 540, the data migration system determines whether the comparison(s) indicate a migrated attribute. If the comparison(s) do indicate migrated attribute(s), then the data migration system moves on to block 542, and notifies the client of the migrated attribute(s) detected, and outputs the migrated attribute information to the migration attribute information database and/or to the client, at block 544. If the comparison does not indicate a migrated attribute, then the system does nothing until time D (not shown in the Figure).

It is recognized that other embodiments of FIG. 5 may be used. For subsequent time periods, the data migration system performs the method as depicted at time C, with additional blocks representing accessing/receiving the consumer records processed at each additional previous time period, and also additional blocks representing access/receiving the information about migrated attributes at each additional previous time period. Also, at the equivalent of block 538 of time C, the data migration system at subsequent time periods would compare each of the consumer records processed at the subsequent time period with the consumer records processed at each previous time period as well as with the migrated attributes of each previous time period.

Example Scenario

An example scenario will now be discussed, explaining one embodiment of the operation of the data migration system during four consecutive time periods for one consumer, through it is recognized that the system may be performed for many consumers. A company which manages consumer accounts would like to receive early warning signs of potential derogatory or delinquent behaviors about a specific consumer account. The company system sends the record to the data migration system for the consumer account for which company would like to receive warning signs. It is recognized that the data migration system may calculate several attributes for various other reasons, and may only use a subset of these attributes for migration analysis. The company also selects the following customizable options: (1) process records every day; (2) calculate the attribute of total available credit balance on credit card; (3) notify company when total available credit balance on credit card goes below $200; (4) notify company when total available credit balance on credit card changes by more than $1000 within 3 days; (5) send records meeting migration criteria; (6) send actual attributes from relevant time periods; (7) send the threshold criteria value used.

On day 1, the data migration system accesses the credit data in its database on day 1 to calculate the available credit balance on the credit card of the consumer account for which a record was received. After the calculation, the data migration system outputs the processed record to a processed records database, indicating the credit balance associated with the account on day 1. For example, the balance might be $1,400 on day 1.

Then, the following day, day 2, the data migration system access the credit data in its database to calculate the available credit balance on the credit card of the same consumer account, since the company has selected daily processing. After the calculation, the data migration system outputs the processed record to a processed records database, indicating the credit balance associated with the account on day 2. For example, the balance might be $800 on day 2.

In addition, the data migration system compares the $800 of day 2 to the $1,400 of day 1, to make a determination of whether there has been a migration of attributes. Since the company wants to be notified of when total available credit balance on credit card goes below $200 and/or (when total available credit balance on credit card changes by more than $1000 within 3 days, the data migration system would determine that there are no migrated attributes.

Then, the following day, day 3, the data migration system access the credit data in its database to calculate the available credit balance on the credit card of the same consumer account. After the calculation, the data migration system outputs the processed record to a processed records database, indicating the credit balance associated with the account on day 3. For example, the balance might be $100 on day 3.

In addition, the data migration system compares the $100 of day 3 to the $800 of day 2 and the $1,400 of day 1, to make a determination of whether there has been a migration of attributes. Since the company wants to be notified of when total available credit balance on credit card goes below $200 and/or (when total available credit balance on credit card changes by more than $1000 within 3 days, the data migration system would determine that there are migrated attributes. The data migration system would output the migrated attribute information to the migration attribute information database.

Then, the data migration system outputs information to the company's systems. Since the company has opted to receive the records meeting migration criteria, the attributes from relevant time periods and the threshold criteria value used, the data migration system outputs to the company's systems: the consumer record, with an indication of the balance on all three days, as well as the fact that the balance has gone below $200 and has changed by more than $1,000 in less than 3 days.

Then, the following day, day 4, the data migration system access the credit data in its database to calculate the available credit balance on the credit card of the same consumer account. After the calculation, the data migration system outputs the processed record to a processed records database, indicating the credit balance associated with the account on day 4. For example, the balance might be $1,100 on day 3.

In addition, the data migration system compares the $1,100 of day 4 to the $100 of day 3, the $800 of day 2 and the $1,400 of day 1, to make a determination of whether there has been a migration of attributes. Since the company wants to be notified of when total available credit balance on credit card goes below $200 and/or (when total available credit balance on credit card changes by more than $1000 within 3 days, the data migration system would determine that there is a migrated attribute. The data migration system would output the migrated attribute information to the migration attribute information database.

Then, the data migration system outputs information to the company's systems. Since the company has opted to receive the records meeting migration criteria, the attributes from relevant time periods and the threshold criteria value used, the data migration system outputs to the company's systems: the consumer record, with an indication of the balance on all days 3 and 4, as well as the fact that the balance has changed by more than $1,000 in less than 3 days.

Computing System

Figure 6:
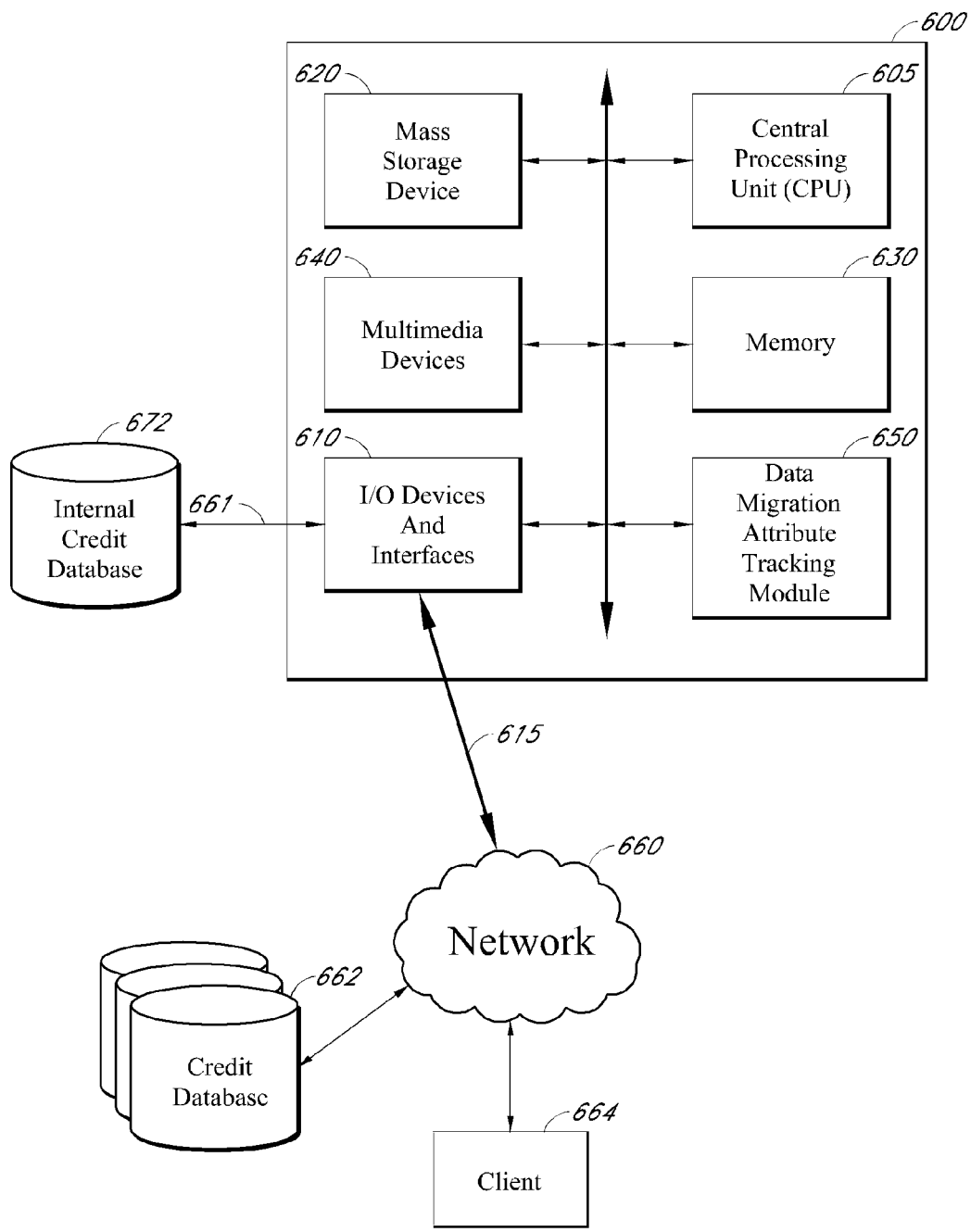
FIG. 6 is a block diagram depicting one embodiment of a computer hardware system configured to run software for implementing one or more embodiments of the systems and methods for tracking consumer accounts using data migration described herein.

In some embodiments, the systems, computer clients and/or servers described above take the form of a computing system 600 as shown in FIG. 6. FIG. 6 is a block diagram showing an embodiment in which computing system 600 is in communication with a network 660 and various systems are also in communication with the network 660. The computing system 600 may be used to implement systems and methods described herein. For example, the computing system 600 may be configured to receive credit data information regarding individuals and generate reports and/or alerts for one or more clients. In some embodiments, the system is accessed remotely by the client, the system is local to the client, and/or a combination of the two. One example client may be a bank or credit card company that uses the systems and methods to manage the accounts of their customers and/or potential customers.

Although the description provided herein refers to individuals, consumers, or customers, the terms "individual," "consumer," and "customer" should be interpreted to include applicants, or groups of individuals or customers or applicants, such as, for example, married couples or domestic partners, organizations, groups, and business entities.

The computing system 600 includes, for example, a server, system or mainframe. In one embodiment, the computing system 600 comprises a personal computer that is IBM, Macintosh, or Linux/Unix compatible, a laptop computer, a cell phone, a personal digital assistant, a kiosk, or an audio player, for example. In one embodiment, the exemplary computing system 600 includes a central processing unit ("CPU") 605, which may include a conventional microprocessor. The computing system 600 further includes a memory 630, such as random access memory ("RAM") for temporary storage of information and a read only memory ("ROM") for permanent storage of information, and a mass storage device 620, such as a hard drive, diskette, or optical media storage device. Typically, the modules of the computing system 600 are connected to the computer using a standard based bus system. In different embodiments, the standard based bus system could be Peripheral Component Interconnect ("PCP"), Microchannel, Small Computer System Interface ("SCSI"), Industrial Standard Architecture ("ISA") and Extended ISA ("EISA") architectures, for example. In addition, the functionality provided for in the components and modules of computing system 600 may be combined into fewer components and modules or further separated into additional components and modules.

The computing system 600 is generally controlled and coordinated by operating system software, such as Windows 95, Windows 98, Windows NT, Windows 2000, Windows XP, Windows Vista, Unix, Linux, SunOS, Solaris, or other compatible operating systems. In Macintosh systems, the operating system may be any available operating system, such as MAC OS X. In other embodiments, the computing system 600 may be controlled by a proprietary operating system. Conventional operating systems control and schedule computer processes for execution, perform memory management, provide file system, networking, I/O services, and provide a user interface, such as a graphical user interface ("GUI"), among other things.

The exemplary computing system 600 includes one or more commonly available input/output (I/O) devices and interfaces 610, such as a keyboard, mouse, touchpad, and printer. In one embodiment, the I/O devices and interfaces 610 include one or more display device, such as a monitor, that allows the visual presentation of data to a user. More particularly, a display device provides for the presentation of GUIs, application software data, and multimedia presentations, for example. The computing system 600 may also include one or more multimedia devices 640, such as speakers, video cards, graphics accelerators, and microphones, for example.

In the embodiment of FIG. 6, the I/O devices and interfaces 610 provide a communication interface to various external devices. In the embodiment of FIG. 6, the computing system 600 is electronically coupled to a network 660, which comprises one or more of a LAN, WAN, or the Internet, for example, via a wired, wireless, or combination of wired and wireless, communication link 615. The network 660 communicates with various computing devices and/or other electronic devices via wired or wireless communication links.

According to FIG. 6, information is provided to computing system 600 over the network 660 from one or more data sources including, for example, credit databases 662 and/or client consumer data. The information supplied by the various data sources may include credit data, demographic data, application information, product terms, accounts receivable data, and financial statements, for example. In addition to the devices that are illustrated in FIG. 6, the network 660 may communicate with other data sources or other computing devices. In addition, the data sources may include one or more internal and/or external data sources. In some embodiments, one or more of the databases or data sources may be implemented using a relational database, such as Sybase, Oracle, CodeBase and Microsoft® SQL Server as well as other types of databases such as, for example, a flat file database, an entity-relationship database, and object-oriented database, and/or a record-based database.

In addition to supplying data, client 664 may further request information from the computing system 600. For example, the client 664 may request data related to a consumer or a group of consumers. Such a request may include consumer information identifying the consumer(s) for which information is desired.

The I/O devices and interfaces 610 further provide a communication interface to an internal credit database 672. In the embodiment of FIG. 6, the computing system 600 is coupled to a secured network 661, such as a secured LAN, for example. The system communicates with the internal credit database 672 through the secured network 661. In some embodiments, the internal credit database 672 is configured to communicate with additional computing devices over the network 660 or some other network, such as a LAN, WAN, or the Internet via a wired, wireless, or combination of wired and wireless, communication link. In certain embodiments, the client 664 may have access to the internal credit database 672 through the network 660, and/or the secured network 661.

In the embodiment of FIG. 6, the computing system 600 also includes a data migration attribute tracking module 650 that may be executed by the CPU 605. This module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In the embodiment shown in FIG. 6, the computing system 600 is configured to execute data migration attribute tracking module 650, among others, in order to calculate various attributes and compare them across different time periods among the internal credit database 672 and/or credit database(s) 662. In some embodiments, the data migration attribute tracking module 650 may be configured to obtain data from internal credit database 672, from credit database(s) 662 or from a combination of internal credit database 672 and credit database(s) 662.

In general, the word "module," as used herein, refers to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage.

It is recognized that the term "remote" may include data, objects, devices, components, and/or modules not stored locally, that is not accessible via the local bus. Thus, remote data may include a device which is physically stored in the same room and connected to the computing system via a network. In other situations, a remote device may also be located in a separate geographic area, such as, for example, in a different location, country, and so forth.

Additional Embodiments

All of the processes described above may be embodied in, and fully automated via, software code modules executed by one or more general purpose computers. The code module may be stored in any type of computer-readable medium or other computer storage device. Some or all of the methods may alternatively be embodied in specialized computer hardware. As will be apparent, the features, and attributes of the specific embodiments disclosed above may be combined in different ways to form additional embodiments, all of which are fall within the scope of the present disclosure. Although this disclosure has been described in terms of certain preferred embodiments and applications, other embodiments and applications that are apparent to those of ordinary skill in the art, including embodiments which do not provide all of the features and advantages set forth herein, are also within the scope of this disclosure.

The invention claimed is:

1. A computerized method for tracking consumer data comprising:
    calculating, by a computer system comprising one or more processors, a plurality of attributes for a first time period for respective consumer accounts associated with a lender, wherein the attributes comprise at least one of total revolving debt, total credit utilization, credit balance, or credit limit;
    calculating the same plurality of attributes for a first subsequent time period for the same respective consumer accounts;
    determining whether one or more calculated attributes for respective consumer accounts for the first subsequent time period and for the first time period meet respective thresholds of change associated with the attributes, wherein the thresholds of change are indicative of warning signs to the lender; and
    in response to determining that one or more thresholds of change are met, outputting (1) notifications indicating the consumer accounts for which one or more of the calculated attributes meet the one or more thresholds of change and (2) information about which of the one or more thresholds of change are met.

2. The computerized method of claim 1, further comprising:
    outputting a result of the one or more thresholds of change met.

3. The computerized method of claim 1, further comprising:
    calculating scores for the respective consumer accounts; and
    outputting the scores.

4. The computerized method of claim 1, further comprising:
    receiving at least one lender-defined threshold of change.

5. The computerized method of claim 4, wherein the at least one lender-defined threshold of change comprises logic.

6. The computerized method of claim 4, wherein the at least one lender-defined threshold of change comprises credit data criteria.

7. The computerized method of claim 5, wherein the at least one lender-defined threshold of change comprising logic is configured to determine an amount of times the threshold has been met in a specified time period.

8. The computerized method of claim 5, wherein the at least one lender-defined threshold of change comprising logic is configured to determine a relative criticality of the attributes for which the threshold has been met.

9. The computerized method of claim 1, wherein the first subsequent time period is at least one of: one month after the first time period, two weeks after the first time period, one week after the first time period, and one day after the first time period.

10. The computerized method of claim 1, wherein the first subsequent time period is different for each of the respective consumer accounts.

11. The computerized method of claim 1, further comprising:
    calculating the same plurality of attributes for a second subsequent time period for the same respective consumer accounts;
    determining whether one or more calculated attributes for respective consumer accounts for the second subsequent time period and the first subsequent time period meet respective thresholds of change associated with the attributes; and
    in response to determining that one or more thresholds of change are met, outputting (1) notifications indicating the consumer accounts for which one or more of the calculated attributes meet the one or more thresholds of change and (2) information about which of the one or more thresholds of change are met.

12. The computerized method of claim 1, further comprising, receiving a request from the lender for information regarding the consumer accounts associated with met thresholds of change.

13. The computerized method of claim 1, wherein the output notifications indicating the consumer accounts for which one or more of the calculated attributes meet the one or more thresholds of change are sent to the lender.

14. A non-transitory storage medium having computer-executable instructions stored thereon, the computer-executable instructions readable by a computing system comprising one or more computing devices, wherein the computer-executable instructions are executable on the computing system in order to cause the computing system to perform operations comprising:
    calculating, by a computer system comprising one or more processors, a plurality of attributes for a first time period for respective consumer accounts associated with a lender, wherein the attributes comprise at least one of total revolving debt, total credit utilization, credit balance, or credit limit;
    calculating the same plurality of attributes for a first subsequent time period for the same respective consumer accounts;
    determining whether one or more calculated attributes for respective consumer accounts for the first subsequent time period and for the first time period meet respective thresholds of change associated with the attributes, wherein the thresholds of change are indicative of warning signs to the lender; and
    in response to determining that one or more thresholds of change are met, outputting (1) notifications indicating the consumer accounts for which one or more of the calculated attributes meet the on or more thresholds of change and (2) information about which of the one or more thresholds of change are met.

15. A system configured to track consumer data, the system comprising:
- a processor;
- a memory in electronic communication with the processor; and
- a data migration attribute tracking module configured to:
    - calculate a plurality of attributes for a first time period for respective consumer accounts associated with a lender, wherein the attributes comprise at least one of total revolving debt, total credit utilization, credit balance, or credit limit;
    - calculate the same plurality of attributes for a first subsequent time period for the same respective consumer accounts;
    - determine whether one or more calculated attributes for respective consumer accounts for the first subsequent time period and for the first time period meet respective thresholds of change associated with the attributes, wherein the thresholds of change are indicative of warning signs to the lender; and
    - in response to determining that one or more thresholds of change are met,
        - (1) outputting notifications indicating the consumer accounts for which one or more of the calculated attributes meet the one or more thresholds of change and
        - (2) information about which of the one or more thresholds of change are met.

16. The system of claim 15, the data migration attribute tracking module further configured to output a result of the one or more thresholds of change met.

17. The system of claim 15, the data migration attribute tracking module further configured to calculate scores for the respective consumer accounts; and to output the scores.

18. The system of claim 15, the data migration attribute tracking module further configured to receive at least one lender-defined threshold of change.

19. The system of claim 18, wherein the at least one lender-defined threshold of change comprises logic.

20. The system of claim 18, wherein the at least one lender-defined threshold of change comprises credit data criteria.

21. The system of claim 18, wherein the at least one lender-defined threshold of change comprising logic is configured to determine an amount of times the threshold has been met in a specified time period.

22. The system of claim 18, wherein the at least one lender-defined threshold of change comprising logic is configured to determine a relative criticality of the attributes for which the threshold has been met.

23. The system of claim 15, wherein the first subsequent time period is at least one of: one month after the first time period, two weeks after the first time period, one week after the first time period, and one day after the first time period.

24. The system of claim 15, wherein the first subsequent time period is different for each of the plurality of consumer accounts.

25. The system of claim 15, the data migration attribute tracking module further configured to:
- calculate the same plurality of attributes for a second subsequent time period for the same respective consumer accounts;
- determine whether one or more calculated attributes for respective consumer accounts for the second subsequent time period and for the first subsequent time period meet respective thresholds of change associated with the attributes, wherein the thresholds of change are indicative of warning signs to the lender; and
- in response to determining that one or more thresholds of change are met, (1) output notifications indicating the consumer accounts for which one or more of the calculated attributes meet the one or more thresholds of change and (2) information about which of the one or more thresholds of change are met.

26. A computing system comprising:
- one or more computer processors configured to execute software modules;
- a computer readable medium storing software modules configured for execution by the one or more computer processors, the software modules including:
    - an attribute calculation module configured to
        - calculate a first plurality of attributes associated with one or more financial accounts of a consumer, wherein the first plurality of attributes are based on financial data of the respective financial accounts as of a first time; and
        - calculate a second plurality of attributes associated with the one or more financial accounts of the consumer, wherein the second plurality of attributes are based on financial data of the respective financial accounts as of a second time that is later than the first time;
    - a comparison module configured to
        - determine respective differences between corresponding attributes of the first plurality of attributes and the second plurality of attributes; and
        - identify any determined differences that exceed one or more thresholds of change associated with respective attributes; and
    - a reporting module configured to provide indications of any financial accounts for which the determined differences exceed the one or more thresholds of change and information about which of the one or more thresholds of change are exceeded.

* * * * *